United States Patent [19]

Havens et al.

[11] Patent Number: 4,882,894

[45] Date of Patent: Nov. 28, 1989

[54] AGENT FOR IMPARTING ANTISTATIC CHARACTERISTICS TO A THERMOPLASTIC POLYMER AND A THERMOPLASTIC POLYMER COMPOSITION CONTAINING THE AGENT

[75] Inventors: Marvin R. Havens; Joseph R. Lovin, both of Greer, S.C.

[73] Assignee: W. R. Grace & Co.-Conn., Duncan, S.C.

[21] Appl. No.: 918,451

[22] Filed: Oct. 14, 1986

[51] Int. Cl.$^4$ .............................................. B65B 29/00
[52] U.S. Cl. .................................... 53/461; 206/328; 206/331; 428/178; 428/424.8; 524/159; 524/606; 524/910
[58] Field of Search ............... 524/159, 910; 53/461; 428/178, 424.8

[56] References Cited

U.S. PATENT DOCUMENTS

| | | | |
|---|---|---|---|
| 2,214,405 | 9/1940 | Coffman | 260/33 |
| 3,022,543 | 2/1958 | Baird, Jr. et al. | 18/57 |
| 3,164,481 | 1/1965 | Shibe | 106/10 |
| 3,220,985 | 11/1965 | Breslow | 260/79.3 |
| 3,223,545 | 12/1965 | Gallaugher et al. | 106/287 |
| 3,441,552 | 4/1969 | Rombusch et al. | 260/937 |
| 3,741,253 | 6/1973 | Brax et al. | 138/137 |
| 3,821,182 | 6/1974 | Baird, Jr. et al. | 260/91.7 |
| 4,048,428 | 9/1977 | Baird, Jr. et al. | 526/343 |
| 4,061,869 | 12/1977 | Schwarze | 524/910 |
| 4,188,443 | 2/1980 | Mueller et al. | 428/359 |
| 4,194,039 | 3/1980 | Mueller | 428/213 |
| 4,229,241 | 10/1980 | Mueller | 156/243 |
| 4,268,583 | 5/1981 | Hendy | 524/910 |
| 4,274,900 | 6/1981 | Mueller et al. | 428/213 |
| 4,347,332 | 8/1982 | Odorzynski et al. | 524/169 |
| 4,391,952 | 7/1983 | Lybrand | 524/910 |
| 4,494,651 | 1/1985 | Malcolm | 206/328 |
| 4,526,952 | 7/1985 | Zeitler | 524/910 |
| 4,536,532 | 8/1985 | Miller | 524/141 |
| 4,576,669 | 3/1986 | Caputo | 156/45 |
| 4,579,516 | 4/1986 | Caputo | 425/388 |
| 4,605,684 | 8/1986 | Pcolinsky | 521/107 |
| 4,802,325 | 2/1989 | Duncan | 53/461 |

FOREIGN PATENT DOCUMENTS 0016617 of 0000 European Pat. Off. .
0224979 of 0000 European Pat. Off. .

OTHER PUBLICATIONS

Akzo Chemie Brochure on Ketjenflex 8.
Monsanto Brochure on Santicizer 8.
Akzo Chemie Brochure on Ketjenflex 9.
Monsanto Brochure on Santicizer 9.
Unitex Brochure on Uniplex 214, 9/87.
"Nylon 12 GRILAMID® The High Performance Polyamide" published in Switzerland in Aug., 1981 by Emser Werke AG.
"Organic Chemistry" second edition, by Morrison and Boyd copyrighted in 1966, Library of Congress catalog card No. 66-25695, pp. 323-326.
Electrostatic Properties of Materials, Oct. 8, 1982.

Primary Examiner—C. Warren Ivy
Attorney, Agent, or Firm—John J. Toney; William D. Lee, Jr.; Jennifer L. Skord

[57] ABSTRACT

Disclosed is a thermoplastic polymeric composition having antistatic characteristics and a method to make same. The composition comprises a thermoplastic polymer in admixture with an antistatic agent. In one embodiment the polymer is nylon 12 and the agent is N-butyl benzenesulfonamide. Also disclosed is the antistatic polymeric composition in a film, which is useful for packaging static sensitive devices such as electronic circuit boards, or for packaging devices that must be protected from static electricity such as devices in a medical operating room where explosive oxygen and/or ether are present.

12 Claims, No Drawings

AGENT FOR IMPARTING ANTISTATIC CHARACTERISTICS TO A THERMOPLASTIC POLYMER AND A THERMOPLASTIC POLYMER COMPOSITION CONTAINING THE AGENT

This invention relates to an agent which will, when added to a thermoplastic polymer, impart antistatic characteristics thereto. Such antistatic polymers are useful, for instance, in making packaging for electronic devices that are sensitive to static electricity.

BACKGROUND OF THE INVENTION

When two surfaces are brought in contact with each other, a transfer of electrons may occur resulting in a residual static electrical charge when the surfaces are separated. This phenomena is known as triboelectricity. If the surface is composed of a material that is a conductor, the electrons will dissipate quickly thereby eliminating the excess charge. On the other hand, if the surface is composed of a material that is an insulator (a dielectric), the surface charge takes much longer to dissipate.

Thermoplastic polymers, however, are typically excellent insulators, having an extremely high surface resistivity of more than $10^{14}$ ohms/square, and thus they are unsatisfactory for uses that require an antistatic nature. As the polymers are nonconductive, they accumulate high charges promoting an attraction for dust and dirt, and they can discharge to any lower potential body with which they come in contact. To modify a polymer so that it will have antistatic characteristics, the resistivity of it must be decreased, i.e. The conductivity is increased which in turn causes an increase in the rate of static dissipation. Increase in conductivity has been accomplished in the past by the use of antistatic agents to promote static-charge decay of surfaces thereby reducing clinging effect, eliminating spark discharge, and preventing accumulation of dust.

It is well known that static charge can be reduced by increasing the moisture content of the atmosphere, and thus the approach in the past has been to use an antistatic agent which will chemically modify the polymer to impart hydrophillic properties to it by providing functional groups that attract moisture to it. For instance, it is well known to apply external antistatic agents onto polymers by conventional coating methods. Also, it is well known to apply internal antistatic agents which are volume dispersed in the polymer; i.e. incorporated into the polymer by compounding or extrusion prior to or during molding or film-forming operations. These agents work by migrating to the polymer surface. This migration is colloquially referred to in the art of polymer chemistry as a "blooming" effect. When the antistatic agent has not remained volume dispersed but instead has bloomed to the surface, the mechanism for moisture attraction is the same as with the external antistatic agents. The atmospheric moisture is attracted causing decay of static charges. Accordingly a high rate of blooming is required.

The following known antistatic agents appear to function in the above-mentioned manner.

An example of an external antistatic agent is described in U.S. Pat. No. 3,223,545 to Gallaugher et al which discloses a dialkanol amide of the formula

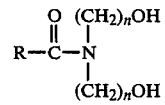

wherein

R is a $C_6$ to $C_{16}$ alkyl and n is an integer from 2 to 4, dispersed in a volatile liquid which is applied to the surface of a solid polymer.

One example of an internal antistatic agent is described in U.S. Pat. No. 3,220,985 to Breslow which discloses modifying hydrocarbon polymers with a monosulfonazide of the formula $RSO_2N_3$, where R is an organic radical inert to the modification reaction. For instance, to an acetone slurry of finely divided polypropylene is added para-toluene sulfonazide, followed by agitation at room temperature to evaporate the acetone solvent. The resultant is then heated at 160° C. for 2 hours.

Another internal antistatic agent is described in U.S. Pat. No. 3,164,481 to Shibe which discloses combining a quaternary ammonium benzosulfimide with a plastic. (For clarity, it is mentioned benzosulfimide is also known as saccharin.) For instance, in Shibe is disclosed Epolene E (a polyethylene supplied by Eastman Chemical Products, Inc., Kingsport, Tenn.) melted together with dodecyl benzyl trimethyl ammonium benzosulfimide and the molten resultant is spread out in a sheet.

Also of interest is the internal antistatic agent described in U.S. Pat. No. 3,441,552 to Rombusch et al. The patent discloses incorporating an alkoxypropylamine of the formula

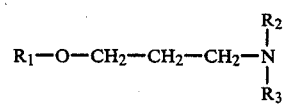

into a polyolefin where $R_1$ represents an alkyl, alkenyl, alkylcycloalkyl, aryl, alkylaryl, or alkenylaryl group of 6 to 25, preferably 8 to 18 carbon atoms in the alkyl or alkenyl moieties and 4 and 18, preferably 6 to 12 carbon atoms in the cycloalkyl moiety, and 6 to 14, preferably 6 to 10 carbon atoms in the aryl moiety; $R_2$ and $R_3$ can each represent a hydrogen atom, or an alkyl or alkenyl group of 1 to 5 carbon atoms. For instance, 100 g of octadecyloxy-propyl-N,N-dimethylamine are homogenized in a blender with 10 kg of polypropylene. The resultant is granulated and injection mold plates are produced from the granulation.

The following patents are also of general interest.

For instance, U.S. Pat. No. 4,536,532 (1985) to Miller, relates to a process for the manufacture of a polyvinyl alcohol homopolymer having a vinyl alcohol content in excess of 95% wherein said homopolymer is mixed with a plasticizer selected from the group consisting of N-substituted $C_{10-20}$ fatty acid amides; aryl, alkaryl, N-aryl aryl, N-alkaryl aryl and N-alkyl alkaryl sulfonamides and alkaryl sulfonamides; N-alkyl pyrrolidones; sulfonated alkyl phenols; aryl and alkaryl phosphates and phosphites; alkylene carbonates and selected mixtures thereof.

Also of general interest is the blend of high melting nylon (melting point between 415° and 440° F.) and ethylene vinyl alcohol copolymer (EVOH) plasticized with lauramide, o,p-toluenesulfonamide, N-ethyl-o,p- toluenesulfonamide or a polyamide of 7000-10000 molecular weight, as described in U.S. Pat. No. 4,347,322 to Odorzynski et al.

Also of general interest is U.S. Pat. No. 4,605,684 (1986) to Pcolinsky which relates to a method of preparing a flexible polyurethane foam from a polyol and a polyisocyanate the improvement which comprises adding to the foam-forming composition from about five to about 25 parts by weight per 100 parts by weight of polyol of an antistatic additive composition comprising one part by weight of a quaternary ammonium compound selected from the group consisting of soya dimethyl ethyl ammonium ethylsulfate, soya dimethyl ethyl ammonium ethylphosphate, and mixtures thereof and from about 0.4 to about 3 parts by weight of a plasticizer composition selected from the group consisting of N-ethyl-o- and p-toluene sulfonamide, o- and p-toluene sulfonamide, tetrakis (2 chloroethyl) ethylene diphosphate, and mixtures thereof, to provide a foam having a reduced tendency to develop and accumulate electrostatic charges.

The antistatic agents useful in the present invention are substantially non-hygroscopic and substantially non-migratable. Thus, unlike with the previous antistatic polymeric compositions, the antistatic properties of the antistatic polymeric composition of the present invention are substantially independent of ambient relative humidity and the agent substantially remains volume dispersed in the polymer. Accordingly, the problem of surface contamination and corrosion when a static sensitive device was in contact with the previous antistatic polymeric compositions is obviated. For instance, the present polymer containing the agent may be made into a single and/or multiply film. Such films have an increased tendency to dissipate electrostatic charges. For instance, the composition may be extruded together with polymers known for their strength such as ethylene vinyl acetate (EVA) or linear low density polyethylene (LLDPE), which film is useful for making packaging, such as a bag or over-wrap, for electronic devices that are sensitive to static electricity. Such a film may also be fashioned to have cushioning characteristics by using bubble cap (also known as air cushioning) machinery such as that described in U.S. Pat. No. 4,576,669 and U.S. Pat. No. 4,579,516, both to Caputo, to make a bubble cap package which provides cushioning and then bagging or wrapping a circuit board therewith. Such a cushioning bubble cap material is also useful in lining a portable work station used for storage and transportation of static electricity sensitive devices such as the work stations disclosed in U.S. Pat. No. 4,494,651 issued in 1985 to Malcolm. Also such a film, which may or may not be in a cushion form, is useful to make a package for devices in a medical operating room where explosive oxygen and/or ether are present and thus protection from static electricity must be provided.

Therefore, it is an object of the present invention to provide an antistatic polymeric composition wherein the antistatic agent is substantially non-migratable and substantially remains volume dispersed in the polymer. It is a further object to provide the antistatic polymeric composition in single-ply or multi-ply film useful for wrapping static sensitive devices. It is also an object to provide such films having an increased tendency to dissipate electrostatic charges.

SUMMARY OF THE INVENTION

The present invention provides a thermoplastic polymeric composition having antistatic characteristics, said composition comprising a thermoplastic polymer in admixture with an antistatic agent.

DETAILED DESCRIPTION OF THE INVENTION

The resultant polymeric composition of the present invention is substantially more conductive as compared to a like polymer that does not contain the agent of this invention. When incorporated into the polymer so that the polymer contains from about 10 to about 80 percent by weight, more preferably about 15 to about 70 percent by weight, of the agent, the agent will generally increase the conductivity of the polymer by an order of magnitude up to several orders of magnitude. There is no particular method required for incorporating the agent into the polymer, and any of the well-known solvent "wet" blending, melt blending, or dry blending methods, such as those discussed in the "BACKGROUND OF INVENTION" section above, may be employed.

This increased conductivity is also exhibited by the ability of the polymer containing the agent to promote static charge decay, i.e. to dissipate a static charge. The polymer alone will not dissipate a static charge, but the polymer containing the agent is able to dissipate 99% of an applied static charge of $\pm 5000$ volts direct current in a short amount of time, i.e. less than 20, more preferably less than 5, most preferably less than 2 seconds.

The Department of Defense (DOD) and the Electronics Industry Association (EIA) each have their own standards on surface resistivity of a material in ohms/square as follows:

| | | SURFACE RESISTIVITY RANGES | |
|---|---|---|---|
| | | Static | |
| Insulative | Antistatic | Dissipative | Conductive |
| DOD greater than $10^{14}$ | $10^{14}$ to $10^9$ | $10^9$ to $10^5$ | less than $10^5$ |
| EIA greater than $10^{13}$ | $10^{13}$ to $10^5$ | | less than $10^5$ |

As can be seen, there are two main differences. One is that EIA defines insulative as above about $10^{13}$ ohms/square, whereas DOD defines insulative as above about $10^{14}$ ohms/square. The other difference is that EIA has one range of about $10^{13}$ to $10^5$ ohms/square as antistatic, which results in antistatic being synonymous with static dissipative. On the other hand, DOD divides this into two separate ranges of about $10^{14}$ to about $10^9$ ohms/square for antistatic and about $10^9$ to about $10^5$ ohms/square for static dissipative. Frequently the literature, especially older literature, equates antistatic with static dissipative in discussions about static electricity.

Thus, the term "antistatic" as used herein described material having a surface resistivity in the range of about $10^9$ to $10^{14}$ ohms/square (Department of Defense standard) and/or a material which can dissipate 99% of an applied static charge of $\pm 5000$ volts direct current in a short amount of time, preferably less than about 20 seconds, more preferably less than about 5 seconds, most preferably less than about 2 seconds (Federal Test Method Standard 101C, Method 4046.1, "Electrostatic Properties of Materials"), and/or a material having a surface resistivity in the range of about $10^5$ to $10^{13}$ ohms/square (an alternative standard of the Electronics Industry Association).

The antistatic agents useful in the present invention are substantially non-hygroscopic and substantially non-migratable. Suitable antistatic agents may be selected from the aromatic sulfonamides. The aromatic sulfonamides may be ortho, meta, or para substituted on the benzene ring thereof, or may be N-substituted on the amide group thereof. It is noted that para-amino substituted benzene sulfonamides are called sulfanilamides, and such compounds have been previously known as the "sulfa" drugs. Representative examples of aromatic sulfonamides include, but are not limited to, benzenesulfonamide, N-butyl benzenesulfonamide, o-toluenesulfonamide, p-toluenesulfonamide, N-ethyl-o-toluenesulfonamide, N-ethyl-p-toluenesulfonamide, or mixtures thereof.

The antistatic agent may be incorporated into any polymer. Nylon polymers (i.e. polyamides) may be advantageously employed. By nylon polymer, it is intended to include copolymers and terpolymers thereof. Suitable nylon polymers are nylons which can be produced as polymers of the reaction products of (i.e. polycondensation products and/or polyaddition products of) various combinations of diacids and diamines or lactams as well as copolymers, terpolymers, et cetera, combinations of lactams, diacids and diamines with lactams, multiple diacids and dibases with lactams, et cetera. It is intended to include, but not limit to, the several such nylons given below. Polymers of the reaction products of diacids and dibases include the polymer of the reaction product of adipic acid and hexamethylene diamine (commonly known as nylon 6/6), the polymer of the reaction product of sebacic acid and hexamethylene diamine (commonly known as nylon 6/10), and polymers of the reaction product of hexamethylenediamine and a 12-carbon dibasic acid (commonly known as nylon 6/12). Polymers of the reaction product of lactams include, but are not limited to caprolactam (commonly known as nylon 6), the polycondensation product of the monomer 11-aminoundecanoic acid (commonly known as nylon 11), and the addition product of lauryllactam or cyclo-decalactam (both of which are commonly known as nylon 12). These and similar lactam copolymers are available with a wide variety of caprolactam and lauryllactam relative amounts. Other commercially available nylons include copolymers made from caprolactam with adipic acid and hexamethylene diamine (commonly known as nylon 666) and terpolymers made from caprolactam and lauryl lactam with adipic acid and hexamethylene diamine (commonly known as nylon 66612). It is further possible to blend physically and extrude various nylons to achieve a wide range of physical properties. A very suitable nylon polymer is nylon 11, nylon 12, a copolymer of nylon 11, a terpolymer of nylon 11, a copolymer of nylon 12, a terpolymer of nylon 12, or mixtures thereof. Commercially available nylon 11 or nylon 12 include, but are not limited to, Nuodex (TM) nylon 12 from Huls, Rilsan (TM) nylon 11 from Atochem, and Grilamid nylon 12 from Emser. In an especially preferred embodiment, the nylon 11 or 12 contains a minor amount, preferably about 5% to 25% by weight, of a nylon 6/12.

In a preferred embodiment, the antistatic polymeric composition, which may be coextruded into a multi-ply film, is obtained from N-butyl benzene sulfonamide, in an amount of about 10% to about 80%, more preferably about 15% to about 70% by weight, of the total, which has been mixed in a blender with nylon 12, and the resultant granulation pelletized. Preferably, a nylon 6/12, in a weight amount less than the nylon 12, is included in the blending. Moreover a useful composition comprising nylon 12 containing about 30% by weight N-butyl benzenesulfonamide and about 15% by weight nylon 6/12 can be purchased as Grilamid (TM) L25N150 and a useful composition comprising nylon 12 containing about 15% by weight N-butyl benzenesulfonamide and about 15% by weight nylon 6/12 can be purchased as Grilamid (TM) L25W40, which is further discussed below.

Manufacturing of films may be accomplished as follows. For instance, the manufacture of shrink films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form. After a post extrusion cooling, the relatively thick "tape" extrudate is then reheated to a temperature within its orientation temperature range and stretched to orient or align the crystallites and/or molecules of the material. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively oriented. The terms "orientation" or "oriented" are used herein to describe generally the process steps and resultant product characteristics obtained by stretching and immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction monoaxial orientation results. When the stretching force is simultaneously applied in two directions biaxial orientation results. The term oriented is also herein used interchangably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film) and initially cooled, is then reheated to within its orientation temperature range and oriented by stretching. The stretch-ing to orient may be accomplished in many ways such as, for example, by "trapped bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

Of course, if a film having little or no orientation is desired, e.g. non-oriented or non-heat shrinkable film, the film may be formed from a non-orientable material or, if formed from an orientable material may be formed from a tube by using a "trapped bubble" technique commonly known as the "hot blown" technique. In forming a hot blown film, the tube is not cooled initially after extrusion or coextrusion but rather is first stretched by a hot blown bubble essentially immediately after extrusion while the tube is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

Whichever film has been made (the non-oriented molecular configuration or the stretch-oriented molecular configuration), it may then be stored in rolls and utilized to package a wide variety of items. If the material was manufactured by "trapped bubble" techniques the material may still be in tubular form or it may have been slit and opened up to form a sheet of film material. In this regard, the product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

If the material is of the heat-shrinkable type, then after wrapping, the enclosed product may be subjected to elevated temperatures, for example, by passing the enclosed product through a hot air tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bag or pouch forming methods, likewise, are well known to those of skill in the art.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating rather than by an extrusion or coextrusion process as was discussed above. In extrusion coating a first tubular layer is extruded and thereafter an additional layer or layers is sequentially coated onto the outer surface of the first tubular layer or a successive layer. Exemplary of this method is U.S. Pat. No. 3,741,253. This patent is generally representative of an extrusion coating process and is hereby incorporated by reference.

Many other process variations for forming films are well known to those in the art. For example, conventional thermoforming or laminating techniques may be employed. For instance, multiple layers may be first coextruded with additional layers thereafter being extrusion coated or laminated thereon, or two multi-layer tubes may be coextruded with one of the tubes thereafter being extrusion coated or laminated onto the other.

In the examples below that involve multilayer structures, the multilayer films were made by a conventional method of manufacturing, known as tubular coextrusion, and colloquially called the hot blown bubble technique to achieve an essentially non-oriented (non-heat-shrinkable) film. A tubular process was utilized wherein a primary coextruded tube of the film was biaxially stretched with internal pressure in the transverse direction and with the use of pinch rolls at different speeds in the machine direction. Then the stretched bubble was cooled and collapsed, and the film wound up as flattened, seamless, tubular film to be used later to make bags, bubble cap, et cetera. When film is made by a tubular process, the tubular film is desirably fully coextruded, as full coextrusion is advantageous in that all layers of the multilayer film are directly melt joined for enhanced interlayer strength. Also, in some of the embodiments, the tube was slit longitudinally, and the two half structures were laminated together to provide a balanced film structure such as in Example VII.

Also, in some embodiments the film structure was then guided through an ionizing radiation field; for example, through the beam of an electron accelerator to receive a radiation dosage in the range up to about 12 megarads (MR). Irradiation of the overall multi-layer film structure enhances structural integrity, as measured by abuse resistance, tensile strength, and/or puncture resistance, et cetera. The irradiation provides enhanced delamination resistance.

If a heat shrinkable, i.e. "oriented", film is desired, after extrusion and cooling, then after irradiation (or without irradiation), the tube may then be heated to soften it, and then the softened tube is passed through pinch rolls and stretch oriented by the trapped blown bubble technique discussed above.

Suitable multi-layer films have the structure: polymer+antistatic agent/one or more layers of polyethylene, or the structure: polymer+antistatic agent/one or more layers of polyethylene/polymer+antistatic agent. Such multi-layer films also have excellent see-through properties which is advantageous for reading code numbers preprinted on a product wrapped with the film. More particularly, some advantageous films have the structure: nylon+aromatic sulfonamide/LLDPE/-nylon+aromatic sulfonamide, the structure: nylon-+aromatic sulfonamide/LLDPE/EVA, or the structure: nylon/nylon+aromatic sulfonamide/nylon. Embodiments of these are illustrated in the Examples below.

DEFINITIONS

Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible symmetrical structures of the material. These structures include, but are not limited to, isotactic, syndiotactic and random symmetries.

The term "polyethylene" as used herein, which "polyethylene" may be employed in the film of the invention, refers to families of resins obtained by substantially polymerizing the gas ethylene, $C_2H_4$. By varying the comonomers, catalysts and methods of polymerization, properties such as density, melt index, crystallinity, degree of branching and crosslinking, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.928 g/cc are called low density polyethylenes while those having densities from about 0.929 g/cc to about 0.940 g/cc are called medium density polyethylenes (MDPE), and those having densities from about 0.941 g/cc to about 0.965 g/cc and over are called high density polyethylenes. The older, classic low density types of polyethylenes are usually polymerized at high pressures and temperatures whereas the older, classic high density types are usually polymerized at relatively low temperatures and pressures.

The term "linear low density polyethylene" (LLDPE) as used herein, for a type of polyethylene which may be employed in the film of the invention, refers to the newer copolymers of ethylene with one or more comonomers selected from $C_4$ to $C_{10}$ alpha olefins such as butene-1, pentene-1, hexene-1, octene-1, etc. in which the molecules thereof comprise long chains with few side chains branches or cross-linked structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts. LLDPE is well known for its structural strength and anti-stresscracking properties. Thus, it serves well in a wrap around material for packaging electronic components which typically have sharp projections. Also, LLDPE is known for its favored properties in the heat shrink process, and thus is well suited if it is desired to make a heat shrinkable film as discussed above. Also, very low density linear low density polyethylenes (VLDPE) may be employed, and such have a density from about 0.910 g/cc to about 0.860 g/cc, or even lower.

The term "ethylene vinyl acetate copolymer" (EVA) as used herein, for a type of polyethylene, refers to a copolymer formed from ethylene and vinyl acetate monomers wherein the ethylene derived units in the copolymer are present in major amounts and the vinyl acetate derived units in the copolymer are present in minor amounts. EVA is known not only for having structural strength, as LLDPE does, but also it is known for providing excellent adhesion to an adjacent layer, which may decrease or even obviate the need for an "adhesive".

Blends of all families of polyethylenes, such as blends of EVA, VLDPE, and LLDPE, may also be advantageously employed.

An "adhesive" is defined herein as the material employed in the adhesive interlayers useful in the multilayer embodiment of the invention, which material may be any of the various adhesives well known in the art of multilayer film making. More particularly, the adhesive interlayers bonded to adjacent layers are composed generally of a polyethylene which is chemically modified by the provision of functional groups having a strong affinity for the adjacent layer and which will form a strong bond under the heat and pressure of coextrusion. An example of a suitable adhesive is one of the Plexar (TM) adhesives commercially available from the Chemplex Company of Rolling Meadows, Ill. Generally, Plexar adhesive is composed of an acid anhydride grafted polyethylene being irradiatively crosslinkable. Plexar adhesives are described in detail in U.S. Pat. Nos. 4,087,587 and 4,087,588. Plexar-2 adhesive may generally be characterized as an adhesive of the type comprising blends of a graft copolymer of a high density polyethylene and at least one unsaturated, fused ring, carboxylic acid anhydride, blended with one or more resin copolymers of ethylene and an ethylenically unsaturated ester. Plexar-3 is preferred which comprises blends of a graft copolymer of a high density polyethylene and at least one unsaturated fused ring carboxylic acid anhydride, blended with a polyethylene resin of one or more homopolymers of ethylene, copolymers of ethylene and an alpha-olefin or any or all of these. Another suitable adhesive is Admer LF500 (TM) commercially available from the Mitsui Company which comprises a low density polyethylene chemically modified with phthalic acid to an extent sufficient for the above stated function.

An "oriented" or "heat shrinkable" material is defined herein as a material which, when heated to an appropriate temperature above room temperature (for example 96° C.), will have a free shrink of 5% or greater in at least one linear direction.

MATERIALS

Various companies supply aromatic sulfonamides. For instance a mixture of ortho and para toluenesulfonamide formerly was supplied by Monsanto Company, St. Louis, Miss., under the name Santicizer (TM) 9, and currently is supplied by Akzo Chemie America, Chicago, Ill., under the name Ketjenflex (TM) 9. N-ethyl-ortho,para-toluenesulfonamide formerly was supplied by Monsanto Company under the name Santicizer (TM) 8, and currently is supplied by Akzo Chemie America under the name Ketjenflex (TM) 8. N-butyl benzene sulfonamide is supplied by Unitex Chemical Corporation, Greensboro, N. C., under the name Uniplex (TM) 214.

EVAL (TM) is EVOH (ethylene vinyl alcohol polymer) supplied by EVAL Corporation.

Surlyn 1652 and Surlyn 1705 are marketed by E. I. du Pont de Nemours and Company. Surlyn polymers are metal salt neutralized copolymers of an alpha-olefin having the formula $RHC=CH_2$ wherein R is H or $C_1$ to $C_8$ alkyl and an alpha,beta-ethylenically unsaturated carboxylic acid. These polymers are described in the disclosures of U.S. Pat. No. 3,355,319 issued Nov. 28, 1967 to Rees for "Self-Supporting Film With A Heat-Sealable Coating Of An Ionic Copolymer Of An Olefin And Carboxylic Acid With Metal Ions Distributed Throughout" and U.S. Pat. No. 3,845,163 issued Oct. 29, 1974 to Murch for "Blends of Polyamides and Ionic Copolymer". Both of these patents are assigned to du Pont.

Plexar-3 (TM) is an adhesive marketed by Chemplex Company, Rolling Meadows, Ill.

EVA LD-318.92 is an ethylene/vinyl acetate copolymer supplied by Exxon.

EVA 32.89 is an ethylene/vinyl acetate copolymer supplied by Exxon.

Grilamid (TM) L25W40 is a nylon 12 containing about 15% by weight N-butyl-benzene-sulfonamide. It is supplied by Emser Werke AG, Zurich, Switzerland.

Grilamid (TM) L25N150 is a nylon 12 containing about 30% by weight N-butyl-benzene-sulfonamide. It is supplied by Emser Werke AG, Zurich, Switzerland.

Dowlex (TM) is Dowlex 2045, which is a linear low density polyethylene supplied by Dow Chemical Company, Midland, Mich.

Escorene (TM) is Escorene LL 3001.63, which is a linear low density polyethylene supplied by Exxon.

EXAMPLES

The following Examples illustrate the preferred embodiments of the invention. It is not intended to limit the invention thereby.

The composition in accordance with the present invention have an increased tendency to dissipate electrostatic charges. In the examples below, the ability of each of samples containing the agent to dissipate a static charge was measured using the procedure described in Federal Test Method Standard 101C, Method 4046.1, "Electro-static Properties of Materials" (change notice dated Oct. 8, 1982) on a static decay meter. Such meters are commercially available, such as the 406C static decay meter supplied by Electrotech Systems, Inc. Except where differences are indicated, samples were conditioned at about room temperature at less than about 15% relative humidity for about 24 hours. After conditioning each was placed in a static decay meter at 72°–73° F. (22°–23° C.) and charged to ±5000 VDC (volts direct current) at less than about 15% relative humidity. The time for 99% of the charge to dissipate was then measured.

EXAMPLE I

Blends were prepared of Grilamid L25W40 (samples A and B below) or Grilamid L25N150 (the remaining samples below) with various polymers such as EVAL (TM), Surlyn (TM), EVA LD-318.92, or Dowlex 2045 LLDPE on a weight percent basis of total blend as indicated below, by mixing in a blender. Each resultant was granulated and extruded into a monolayer film, having a thickness of about 2 mils (51 micrometers). Samples of about 3⅛×7½ inches (about 7.9×19 cm) were cut and tested 4 times on each side thereof, wherein 2 of the 4 were at +5000V and 2 were at −5000V, for a total of 8 tests by applying ±5000 VDC and measuring the decay time as described by Federal Test Method 101C, Method 4046.1 discussed above, except that none of the samples was preconditioned for 24 hours at room temperature at less than about 15% relative humidity, but rather each was tested as is. The conditions inside the static decay meter during the testing were about 72°–73° F. (22°–23° C.) and about 13–15% relative humidity. The average of the 8 tests for each sample is indicated in the table below.

TABLE I

STATIC DECAY TIME (Average of 8 Tests)

MATERIAL % BY WEIGHT

| SAMPLE | Surlyn 1652 | Surlyn 1705 | EVAL | Nylon12 | N-butyl benzene Sulfonamide | EVA LD-318.92 | Dowlex 2045 LLDPE | AVERAGE TIME (SECONDS) |
|---|---|---|---|---|---|---|---|---|
| A | | | 90% | 8.5% | 1.5% | | | above 50 |
| B | | | 75% | 21.25% | 3.75% | | | above 50 |
| C | | | 50% | 42.5% | 7.5% | | | above 50 |
| D | | | | 70% | 30% | | | 0.36 |
| E | | 50% | | 35% | 15% | | | 2.08 |
| F | 50% | | | 35% | 15% | | | 1.23 |
| G | | | | 35% | 15% | 50% | | 0.85 |
| H | | | | 35% | 15% | | 50% | 0.15 |

As can be seen from the table a highly desirable static decay time of about 2 seconds or less was achieved with weight % amounts of N-butyl benzene sulfonamide down to about 15%. At 7.5% or less of the sulfonamide (samples A, B, and C), an acceptable decay time greater than 50 seconds was observed.

EXAMPLE II

Using the method of tubular coextrusion followed by hot blowing a bubble to make a non-oriented film as described above, a multi-ply film with an average thickness of 3.5 mils (about 88 micrometers) was made having the following structure:

| Layer | Material | Function |
|---|---|---|
| 1 | Grilamid L25N150 | Antistatic |
| 2 | Plexar-3 | Adhesive |
| 3 | Dowlex | Dielectric |
| 4 | Plexar-3 | Adhesive |
| 5 | Grilamid L25N150 | Antistatic |

The film was cut into samples of about 3⅛×7½ inches (about 7.9×19 cm), for running tests.

Two tests were run for dielectric strength, which was found to be excellent. A high charge of 19KV did not pierce through the samples, but rather arced around them.

Also, 8 tests were run for surface resistivity and the average was found to be 2.5×10¹¹ ohms/square, well within the antistatic range.

Lastly, 8 tests were run for static decay, 4 for each side, wherein 2 of the 4 were at +5000V and 2 were at −5000V, using Method 4046.1 described above. The average time for 99% of the initial charge of ±5000V to decay was found to be 0.742 seconds.

EXAMPLE III

A film was made as in Example II, except that the film was irradiated at 4 MR after coextrusion and hot blowing the bubble. The resultant was observed to be of improved structural integrity.

EXAMPLE IV

Using the method of tubular coextrusion followed by hot blowing a bubble to make a non-oriented film as described above, a multi-ply film with an average thickness of 2 mils (51 micrometers) was made having the following structure.

| Layer | Material | Function |
| --- | --- | --- |
| 1 | Grilamid L25N150 | Antistatic |
| 2 | Plexar-3 | Adhesive |
| 3 | Escorene | Dielectric |
| 4 | Escorene | Dielectric |
| 5 | Escorene | Dielectric |
| 6 | Escorene | Dielectric |
| 7 | EVA 32.89 | Dielectric |

The film was cut into samples of about 3⅛×7½ inches (about 7.9×19 cm), for running tests.

Two tests were run for dielectric strength, and the average was found to be 5.3 KV.

Also, 8 tests were run for surface resistivity and the average was found to be between 10⁹ and 10¹² ohms/square, well within the antistatic range.

Lastly, 8 tests were run for static decay, 4 for each side wherein 2 of the 4 were at +5000V and 2 were at −5000V, using Method 4046.1 described above. The average time for 99% of the initial charge of ±5000V to decay was found to be 0.990 seconds.

EXAMPLE V

A film was made as in Example IV, except that the film was irradiated at 9 MR after coextrusion and hot blowing the bubble. The resultant was observed to be of improved structural integrity.

EXAMPLE VI

A first roll of the film of Example IV was longitudinally thermally laminated to a second roll of the film Example IV with the EVA side of each roll being in contact, the resultant having the multi-ply structure:

Grilamid/Plexar/Escorene/EVA/EVA/Escorene/-Plexar/Grilamid.

EXAMPLE VII

A first roll of the film of Example V was longitudinally laminated to a second roll of the film of Example V with the EVA side of each roll being in contact, the resultant having the multi-ply structure:

Grilamid/Plexar/Escorene/EVA/EVA/Escorene/-Plexar/Grilamid.

EXAMPLE VIII

Using a bubble cap machine such as those described in U.S. Pat. No. 4,576,669 and U.S. Pat. No. 4,579,516 both to Caputo, the film of Example IV was fed into the machine to make bubble cap. A first roll of the film was fed into the machine at about 240°-260° F. (about 115°-127° C.) to form ⅜ inch (0.95 cm) diameter bubbles while a second roll of the film was fed into the machine at about 350° F. (177° C.) to seal to the first roll (with the EVA side of each roll being in contact) thereby entrapping air in the bubbles, the resultant having the multi-ply structure:

Grilamid/Plexar/Escorene/EVA/EVA/Escorene/-Plexar/Grilamid.

Electronic circuit boards were wrapped with the resultant bubble cap film. The film was very tough and afforded excellent cushioning. Also, no corrosion of the wrapped board was observed during storage. Also, portable work stations such as those according to U.S. Pat. No. 4,494,651 were lined with resultant bubble cap.

EXAMPLE IX

Bubble cap was made as in Example VIII, but using the irradiated film of Example V instead of the unirradiated film of Example IV.

Electronic circuit boards were wrapped with the resultant bubble cap film. The film was very tough and afforded excellent cushioning. Also, no corrosion of the wrapped board was observed during storage. Also, portable work stations such as those according to U.S. Pat. No. 4,494,651 were lined with resultant bubble cap.

EXAMPLE X

Using the method as in Example II, a film is made having the structure: nylon 6/Grilamid L25N150/nylon 6, and it exhibits a desirable static decay time of less than about 2000 milliseconds.

While certain representative embodiments and details have been shown for the purpose of illustration, numerous modifications to the formulations described above can be made without departing from the invention disclosed.

We claim:

1. A method for protecting wrapped static sensitive devices from electrostatic charges comprising:
   a. providing a wrap comprising an antistatic film having one or more layers, wherein at least one layer comprises a composition of a thermoplastic polymer in admixture with an antistatic agent wherein said polymer comprises nylon and said antistatic agent comprises aromatic sulfonamide that is substantially non-hygroscopic and substantially non-migratable; and
   b. enclosing said wrap about a selected device.

2. The method of claim 1, wherein said film comprises a monolayer film.

3. The method of claim 1, wherein said film comprises a film having at least two layers.

4. The method of claim 1, wherein the antistatic agent is present in the admixture in an amount from about 10% to about 80% by weight.

5. The method of claim 1, wherein the aromatic sulfonamide is benzenesulfonamide, N-butyl benzenesulfonamide, o-toluenesulfonamide, p-toluenesulfonamide, N-ethyl-o-toluene sulfonamide, N-ethyl-p-toluenesulfonamide, or mixtures thereof.

6. The method of claim 1, wherein said film comprises a film having at least two layers wherein one layer of said at least two layers comprises a nylon polymer in admixture with an aromatic sulfonamide, and the other layer of said at least two layers comprises a polyethylene.

7. The method of claim 6, wherein the polyethylene is LDPE, MDPE, HDPE, LLDPE, VLDPE, EVA or a mixture thereof.

8. The method of claim 1, wherein said film comprises at least the multilayer structure: nylon+aromatic sulfonamide/polyethylene/polyethylene/nylon+aromatic sulfonamide, in air cushion form.

9. The method of claim 1, wherein said film has been irradiated at a dosage up to about 12 MR.

10. The method of claim 1, wherein said film is oriented.

11. A multiply film having anti-static characteristics comprising at least the multilayer structure: nylon+aromatic sulfonamide/polyethylene, wherein said aromatic sulfonamide is substantially non-hygroscopic and substantially non-migratable.

12. The multiply film of claim 11, comprising at least the multilayer structure: nylon+aromatic sulfonamide/polyethylene/polyethylene/nylon+aromatic sulfonamide, in air cushion form.

* * * * *